United States Patent
Kerr et al.

(10) Patent No.: US 7,902,299 B2
(45) Date of Patent: Mar. 8, 2011

(54) SINGLE ION CONDUCTOR CROSS-LINKED POLYMERIC NETWORKS

(75) Inventors: John Borland Kerr, Oakland, CA (US); Shanger Wang, Fairfield, CA (US); Jun Hou, Painted Post, NY (US); Steven Edward Sloop, Berkeley, CA (US); Yong Bong Han, Berkeley, CA (US); Gao Liu, Oakland, CA (US)

(73) Assignee: The Regents of the University of California, Berkeley, CA (US)

( * ) Notice: Subject to any disclaimer, the term of this patent is extended or adjusted under 35 U.S.C. 154(b) by 1306 days.

(21) Appl. No.: 11/230,709

(22) Filed: Sep. 19, 2005

(65) Prior Publication Data
US 2006/0041075 A1 Feb. 23, 2006

Related U.S. Application Data

(62) Division of application No. 10/160,495, filed on May 31, 2002, now Pat. No. 6,956,083.

(60) Provisional application No. 60/294,954, filed on May 31, 2001, provisional application No. 60/294,724, filed on May 31, 2001.

(51) Int. Cl.
*C08F 297/02* (2006.01)

(52) U.S. Cl. ............. 525/242; 525/69; 525/83; 525/118; 525/258; 525/329.9; 525/259

(58) Field of Classification Search .......... 525/69, 525/83, 118, 258, 259, 329.9, 242
See application file for complete search history.

(56) References Cited

U.S. PATENT DOCUMENTS

| | | | |
|---|---|---|---|
| 5,102,751 A | 4/1992 | Narang et al. | |
| 5,112,512 A | 5/1992 | Nakamura | |
| 5,173,205 A | 12/1992 | Marchese et al. | |
| 5,501,920 A * | 3/1996 | Andrei et al. | 429/317 |
| 5,648,186 A | 7/1997 | Daroux et al. | |
| 5,747,604 A | 5/1998 | Allcock et al. | |
| 5,755,985 A | 5/1998 | Vallee et al. | |
| 5,873,915 A | 2/1999 | Andrei et al. | |
| 5,919,442 A | 7/1999 | Yin et al. | |
| 5,968,681 A | 10/1999 | Miura et al. | |
| 5,998,559 A | 12/1999 | Narang et al. | |
| 6,063,522 A * | 5/2000 | Hamrock et al. | 429/200 |
| 6,159,389 A | 12/2000 | Miura et al. | |
| 6,162,563 A | 12/2000 | Miura et al. | |
| 6,201,071 B1 | 3/2001 | Miura et al. | |
| 6,239,204 B1 * | 5/2001 | Miura et al. | 524/401 |
| 6,365,294 B1 | 4/2002 | Pintauro et al. | |
| 6,586,133 B1 * | 7/2003 | Teeters et al. | 429/152 |
| 2002/0045045 A1* | 4/2002 | Adams et al. | 428/403 |

OTHER PUBLICATIONS

Cowie et al, Novel single ion, comb-brach polymer electrolytes, Solid State Ionics 123, 1999, 233-242.*

(Continued)

*Primary Examiner* — Randy Gulakowski
*Assistant Examiner* — Alicia Toscano
(74) *Attorney, Agent, or Firm* — Lawrence Berkeley National Laboratory; Robin C. Chiang

(57) ABSTRACT

Single ion conductors comprising polymer electrolytes prepared by grafting a salt compound onto a comb-branch polymer or dendrimer are disclosed having superior properties.

7 Claims, 10 Drawing Sheets

OTHER PUBLICATIONS

Rietman, et al., "Single-Ion Conductivity in Comblike Polymers," Journal of Polymer Science: Part C: Polymer Letters, vol. 28, pp. 187-191 (1990).

Zhou, et al., "Cation transport polymer electrolytes. Siloxane comb polymers with pendant oligo-oxyethylene chains and sulphonate groups," Polymer Communications, vol. 30, pp. 52-55, (Feb. 1989).

* cited by examiner

FIG. 9

$F_2C=FCHCH_2Br + Na^{+\,-}O-(CH_2CH_2O-)_nCH_2CH=CH_2$ $\rightarrow F_2C=FCHCH_2-O-(CH_2CH_2O-)_n CH_2CH=CH_2$ $F_2C=FCHCH_2-O-(CH_2CH_2O-)_nCH_2CH=CH_2 + LiHSO_3$ $\rightarrow LiSO_3C\ F_2CFHCH_2-O-(CH_2CH_2O-)_n CH_2CH=CH_2$

US 7,902,299 B2

SINGLE ION CONDUCTOR CROSS-LINKED POLYMERIC NETWORKS

CROSS REFERENCE TO RELATED APPLICATIONS

This application is a divisional application of U.S. patent application Ser. No. 10/160,495, filed on May 31, 2002 now U.S. Pat. No. 6,956,083 issued on Oct. 18, 2005, which claims priority to U.S. provisional application Ser. No. 60/294,954, filed May 31, 2001 and U.S. provisional application Ser. No. 60/294,724, filed May 31, 2001, the contents of all applications are hereby incorporated by reference in their entirety. This application is related to U.S. Ser. No. 10/160,604, filed May 31, 2002, now U.S. Pat. No. 7,101,643 issued on Sep. 5, 2006, the contents of which are hereby incorporated by reference in their entirety.

STATEMENT REGARDING FEDERALLY SPONSORED RESEARCH OR DEVELOPMENT

This invention was made with government support under Grant (Contract) No. DE-AC03-76F00098, now Contract No. DE-AC02-05CH11231, awarded by The United States Department of Energy. The government has certain rights to this invention.

BACKGROUND OF THE INVENTION

Since the first introduction of polymer electrolytes as a new class of solid electrolyte for energy storage applications, studies of all solid polymer electrolytes with ionic conductivity of $10^{-5}$-$10^{-2}$ S/cm at ambient temperatures have received much attention owing to the potential applications in various electronic devices. Most of the previous efforts were based on the poly(oxyethylene) complexes with inorganic salts such as $LiClO_4$, $LiSO_3CF_3$ and most recently, $LiN(SO_2CF_3)_2$, these systems are often denoted as binary electrolytes as both anion and cation contribute to the ion transportation. To achieve the practical applications of polymer electrolytes, the polymer has to satisfy several rigorous requirements: (1) bear strong ion coordinating sites to solvate inorganic salts, (2) must be amorphous with substantial segmental flexibility, (3) have durable mechanical and electrochemical stability for specific application environments. Numerous attempts have been tried to increase the conductivity by making PEO derived polymers, such as block copolymers, comb-branch polymers containing methylated poly(ethylene glycol) side chains, polymer networks and adding plasticizer or additives to break down the crystalline phase, which is detrimental to the transportaton of charge carriers. In all these cases, however, the essential problem related to the efficiency of rechargeable polymer lithium batteries, i.e., polarization and very low $Li^+$ transference number is inevitable with a binary salt electrolyte. It is, therefore, desirable to properly design and synthesize polymers with the anion attached covalently to the polymer chain. The instant invention solves the aforementioned problems. Compared with binary systems, single-ion conductors show constant dc conductivity during dc polarization and shall have $Li^+$ cation transfer number of 1. Normally, single-ion conductors have much lower conductivity than binary salt electrolytes under the same conditions, in the range of $10^{-8}$ to $10^{-6}$ S $cm^{-1}$ at 25° C. for alkali metal cations, due to the ion paring to the immobile anion. It is therefore necessary to develop new materials with improved conductivity, e.g., $10^{-4}$ S $cm^{-1}$ at room temperature, if they are to be used for lithium rechargeable batteries.

Hyper-comb-branched polymer conjugates are known in the art, for example U.S. Pat. No. 5,919,442 to Yin et al. Therein are described a class of hyper comb-branched polymers conjugates with carrier materials. This reference is incorporated herein by reference in its entirety.

A number of analyses of the operation of ionically conducting polymer membranes in lithium batteries have concluded that there are significant advantages if the lithium ion transference number is equal to one. In a lithium battery there are reactions for the cations at both electrodes but not for the anions. For a binary salt-polymer system, this will result in the build-up of concentration gradients across the cell, which cannot be relaxed rapidly by the diffusion of the salts. The cell will then exhibit concentration polarization resulting in loss of voltage on discharge and possible irreversible damage on charge. Concentration polarization also limits the thickness of intercalation electrodes that may be used thereby seriously reducing the energy density of the battery. Other groups have also postulated that a non-unity transference number of the electrolyte is one of the causes of dendrite formation, a phenomenon which leads to failure of the battery. Thus, the instant invention solves many problems by preparing a polymer electrolyte with a transference number equal to one—a single-ion conductor.

To prepare a single-ion conductor material, it is necessary to immobilize one of the ions on the polymer material. For a lithium ion single-ion conductor the anion is covalently fixed to the polymer. The best known single-ion conductor is Nafion® which is a perfluorinated polymer with side-chains to which are connected sulfonate groups. Ordinarily, the cations are hydrogen ions and the membrane is used in applications such as fuel cells. The hydrogen ions may be exchanged for lithium ions and the resulting membrane used in a lithium battery.

Several problems are present with this prior art system: the membrane must be used in a dry form to minimize reaction with lithium. The resulting conductivity is rather low as the lithium ions apparently ion-pair rather strongly to the sulfonate ions thereby reducing the mobility. The perfluorinated membrane is inherently unstable to lithium metal. The membrane is also not prepared with sufficient purity for use in lithium batteries. Other groups have attempted to prepare lithium ion single-ion conductors by incorporation of the anions into the backbone of a polyether polymer. Unfortunately, this results in a low conductivity as the cation is trapped by ion-pairing. Attachment of sulfonate or other anions to comb-branch polymers has been attempted. One method has been to use a grafting reaction where an anion-containing side-chain is reacted with a polyphosphazene chloride backbone. The drawbacks with this method have been the use of the polyphosphazene backbone which is inherently unstable to lithium and the lack of control of the grafting reaction which can leave reactive groups on the polymer that interfere with the lithium electrochemistry. Other methods have been to prepare a monomer that contains the anion-containing side chain and then polymerize. The polymerizable group usually must be reacted by a radical method as anionic or cationic methods are interfered with by the ionic group in the monomer. The types of polymerizable groups that are usually employed are acrylate, methacrylate and styrene. The resulting polymer backbone is unstable to lithium and also may restrict the polymer properties due to inherent stiffness of the backbone.

SUMMARY OF THE INVENTION

The invention described herein illustrates the synthesis, characterization, and electrochemical response of a new type of single-ion comb-branch polymer electrolytes. These are defined as a polymer electrolyte with a transferance number equal to one.

BRIEF DESCRIPTION OF THE DRAWINGS

The present invention will be readily understood by the following detailed description in conjunction with the accompanying drawings:

FIG. 9 Synthetic route for the preparation of fluorinated alkyl sulfonate units. n is the length of the side chain FIG. 10 Synthetic route for the preparation of a methide anion intermediate. The anion is grafted on a polymer by silylation reaction via alkyl groups.

DETAILED DESCRIPTION OF THE PREFERRED EMBODIMENTS

Figure 1:
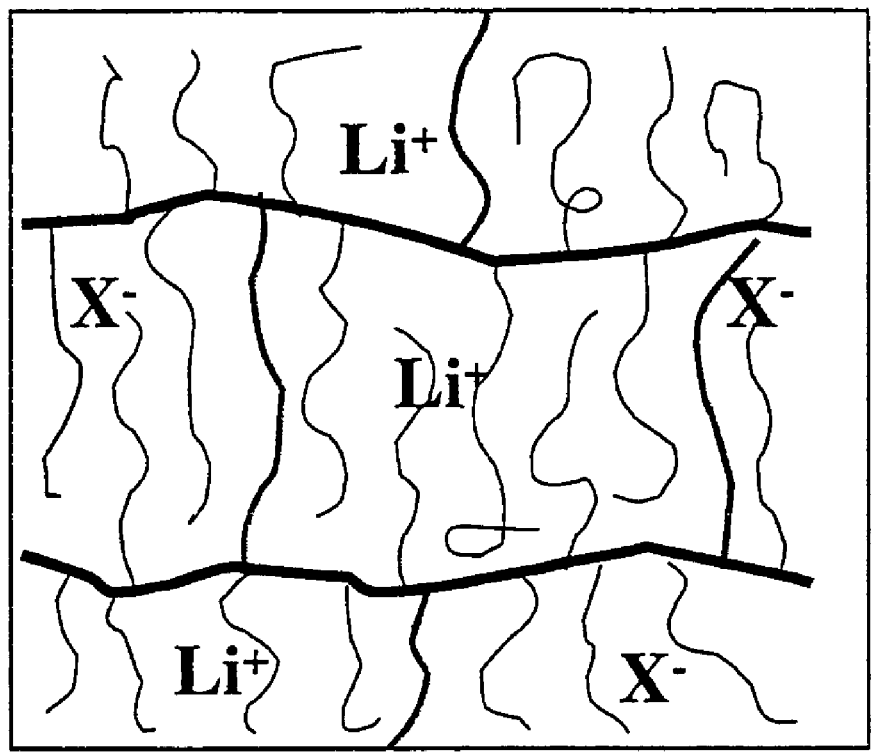
FIG. 1 An example of a cross-linked comb-branch structure. Heavy horizontal lines represent the comb-branch backbone, heavier vertical lines the cross-links and the lighter vertical lines the solvating side-chains. Anions may be fixed to the side chains.

Before describing the present invention in detail, it is to be understood that this invention is not limited to particular salts, methods of synthesis, solvents, or the like, as such may vary. It is also to be understood that the terminology used herein is for the purpose of describing particular embodiments only, and is not intended to be limiting.

The instant invention provides for a method of making a single-ion conductor comprising grafting a salt compound on to a polymer containing double bonds.

The polymer preferably comprises a comb-branch polymer having a backbone selected from the group consisting of poly(alkylenes), polyacrylates, polymethacrylates, polyalkylmethacrylates, polystyrene, polytetrahydrofuran, poly(ethylene glycol), poly(vinyl acetate), polysiloxane, poly(ethylene oxide), poly(propylene oxide), polyether and polyepoxide. More preferably the polymer comprises a comb-branch polytetrahydrofuran ether, a comb-branch polyepoxide ether, a comb-branch polyvinyl ether, a comb-branch polyacrylate ether or a comb-branch polystyrene ether. Especially preferred is a comb-branch polyepoxide ether having the following structure:

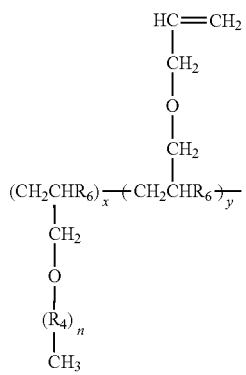

wherein $R_4$ comprises —$(CH_2CH_2O)$—, —$(CH_2CH_2CH_2O)$—, —$(CH_2CH_2CH_2CH_2O)$—, —$(CH_2CHR_5O)$—, where $R_5$ is $CH_3$—, $CH_3O$— or $CH_3OCH_2CH_2O$—, where $R_6$ is —$CH_2$, O, NH, Si or P, n is an integer from about 2 to about 20, and x and y are chosen such that the ratio x/y is from 1 to 30.

It is preferred that the ratio x/y is less than or equal to 20, and especially preferred that the ratio of x/y is 1, 2.5, 5 or 10.

It is preferred that n is between 2 and 7.

It is preferred that $R_6$ is O or —$CH_2$, and especially preferred that $R_6$ is —$CH_2$.

The salt compound is chosen from the group consisting of perfluoroalkylsulfonyl methides and imides, perfluoroalkylsulfonates and alkylsulfonates, where the alkyl group is chosen from the group consisting of lower alkyls and higher alkyls.

A second embodiment of the invention is composition comprising the hydrosilylation reaction product of a comb-branch polymer having ether side groups and a salt compound in the presence of a Pt catalyst, where the same preferred embodiments are recited above in reference to the method, apply to the composition as well.

A third embodiment of the invention is an interpenetrating polymer network comprising a comb-branch polymer or dendrimer having unconjugated side chains, said side chains being capped with solvating moieties such that the solvating moieties are capable of solvating a cation. The invention contemplates that solvating moieties are not all identical. Solvating moieties are selected from the group consisting of imidazoles, hydroxyls, methoxy, pyridines, pyrazines, oxazoles, phosphates, acrylates, carbonates. Imidazoles are preferred. The side chains of the interpenetrating polymer network may be branched or unbranched and is chosen from the group consisting of alkyl, lower alkyl, allyl, alkyl ethers, lower alkyl ethers, allyl ethers, alkylated poly(ethylene glycols). The invention contemplates that the cation is chosen from the group consisting of an alkali metal, alkali earth metal, H, tetraalkyl ammonium, trialkyl ammonium, imidazolium and pyridium, where the alkyl is lower or higher alkyl. Li is preferred. Further, it is preferred that there are substantially no Si—O—C linkages.

The instant invention solves the aforementioned problems with the prior art. The polymer backbone may be chosen from a wide variety of groups to tune the Theological properties. For example, any allyl reactive groups that are used to allow the grafting reaction are unreactive to lithium and cause no impairment of the lithium electrochemistry if they are left unreacted after the treatment. The grafting reaction allows the attachment of a variety of anions, which serve a variety of purposes. The concentration of the anions may be varied at will and the polymer may also be cross-linked at the same time to provide superior mechanical strength. Other groups may also be attached to the polymer by this method to provide other properties and for other applications such as separations, sensors and catalysis.

Dual-ion conductive polymers are defined as having both the anion and cation having mobility in the electrolyte. Single ion conductors have a distinct advantage over dual-ion conductive polymers in that they can charge and discharge more completely, in part because DC polarization does not occur. More particularly, single-ion conducting polymer electrolytes have the capability of exclusively transporting cations, such as lithium, thereby minimizing polarization effects at the electrodes.

Further, single-ion conducting electrolytes avoid the condition wherein both the dissociated cation and anion of the metal salt dissolve in the electrolyte and move toward the positive and negative electrodes at the same time, reducing the ion transportation value.

It must be noted that, as used in this specification and the appended claims, the singular forms "a," "an" and "the" include plural referents unless the content clearly dictates otherwise. Thus, for example, reference to "a polymer" includes mixtures of polymers, and the like.

In this specification and in the claims which follow, reference will be made to a number of terms which shall be defined to have the following meanings:

The term "polymer" is intended to include both oligomeric and polymeric species, i.e., compounds which include two or more monomeric units, which may be a homopolymer or a copolymer. When a single generic structure is shown it is to be understood that the polymers described may contain two or more different monomeric units represented by the single generic structure. A "conductive polymer" is one which possesses conducting as opposed to insulating electrical-transport properties.

The term "homopolymer" intends a polymer incorporating a single species of monomer units. By contrast, the term "copolymer" refers to a polymer constructed from two or more chemically distinct species of monomer units in the same polymer chain. A "block copolymer" is a polymer which incorporates two or more segments of two or more distinct species of homopolymers or copolymers. It is understood that when the term "polymer" is used, it is meant to include comb-branch polymers and dendrimers.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 12 carbon atoms.

The term "lower alkyl" intends an alkyl group of one to six carbon atoms. The term "fluorinated lower alkyl" intends an alkyl group of one to six carbon atoms in which at least one hydrogen atom, and optionally all hydrogen atoms, are replaced with fluorine atoms.

The term "alkenyl" refers to a branched or unbranched hydrocarbon chain containing from 2 to 24 carbon atoms and at least one double bond. "Lower alkenyl" refers to an alkenyl group of 2 to 6, more preferably 2 to 5, carbon atoms. The term "fluorinated lower alkenyl" intends an alkenyl group of one to six carbon atoms in which at least one hydrogen atom, and optionally all hydrogen atoms, are replaced with fluorine atoms.

The term "alkoxy" as used herein intends an alkyl group bound through a single, terminal ether linkage; that is, an "alkoxy" group may be defined as —OR where R is alkyl as defined above. A "lower alkoxy" group intends an alkoxy group containing one to six, more preferably one to four, carbon atoms.

It is understood that the terms alkali and alkali earth metals refer to those elements of Group I and Group II, respectively of the periodic table.

The term "aryl" as used herein refers to a monocyclic aromatic species of 5 to 7 carbon atoms, and is typically phenyl. Optionally, these groups are substituted with one to four, more preferably one to two, lower alkyl, lower alkoxy, hydroxy, and/or nitro substituents or the like.

The term "aralkylene" is used to refer to moieties containing both alkylene and monocyclic aryl species, typically containing less than about 12 carbon atoms in the alkylene portion, and wherein the aryl substituent is bound to the structure of interest through an alkylene linking group. Exemplary aralkylene groups have the structure —$(CH_2)_j$—Ar wherein j is an integer in the range of 1 to 6.

"Halo" or "halogen" refers to fluoro, chloro, bromo or iodo, and usually relates to halo substitution for a hydrogen atom in an organic compound. Of the halos, fluoro is typically preferred.

The term "silane" as used in the claims and specification is also meant to encompass "siloxanes".

"SIC" refers to single ion conductor.

"Optional" or "optionally" means that the subsequently described circumstance may or may not occur, and that the description includes instances where said circumstance occurs and instances where it does not. For example, the phrase "optional covalent bond" means that a covalent bond may or may not be present and that the description includes both the instance when the covalent bond is present and the instance when the covalent bond is not present.

The term "organic Pt complex" and "organic Pt compound" and "organic Pt composition" are used interchangeably and have the same meaning as used herein.

It is understood that this invention prefers the use of Li. However, the invention contemplates that any alkali metal or alkali earth metal will suffice. Also contemplated for use as cations are tetraalkyl ammonium, trialkyl ammonium, where the alkyl is a lower or higher alkyl, imidazolium and pyridium cations.

The polymers of the invention may be prepared using conventional techniques well-known to those skilled in the art of synthetic organic chemistry or which may be found in the relevant texts such as in Kirk-Othmer's Encyclopedia of Chemical Technology, in House's Modern Synthetic Reactions, in C. S. Marvel and G. S. Hiers' text, ORGANIC SYNTHESIS, Collective Volume 1, or the like, the contents of which are incorporated herein by reference.

It is to be understood that the instant invention does not require the addition of plasticizer to achieve the conductivities reported herein. However, plasticizers may be present.

In the systems of the instant invention, there is substantially no water, thus the polyelectrolyte must provide the means of transport. It must provide the anion and means of solvating the proton so that the proton is not so strongly bound to the anion that it cannot move. The anion needs to be able to move around to some extent and the best architecture for this is a comb-branch or dendritic structure. These structures consist of chains attached to a backbone or to a central nucleus. The advantage of these is that one end is free to move around with a range limited by the length of the chain. At high temperatures the segmental motion of the chain will be considerable so that attached protons may move with the chains and hop from one chain to another with the rate of transfer under the control of the binding strength of the proton to the chain. Typically, this is thought to involve ion-pairing between the proton and the anion.

The strength of the attraction between the proton and the anion depends on the nature of the anion and the nature of the solvating medium. In the presence of water, the proton is solvated by the water molecules, which separate it from the anion. In the absence of water the polyelectrolyte structure must provide the solvating medium for the proton. Hence in the prior art Nafion™ there is poor conductivity in the absence of water as the fluorinated structure provides little solvation for the protons which bind strongly to the sulfonate group as a result.

Since water cannot be bound to the polymer, the next best thing would be alcohol groups or amines. It is a relatively simple matter to introduce alcohol groups into the side chains of a polyelectrolyte. However, since the membrane will be subjected to high temperature in the presence of oxygen then oxidation to carboxylic acids will occur, resulting in an undesired anionic group in the electrolyte. Attachment of pyridine or imidazole to side chains can provide solvating groups that are resistant to oxidation. The imidazole in particular has been found to be resistant to oxidation by hydrogen peroxide. Alternative solvating groups for protons might also include phosphates, acrylates or carbonates.

A high temperature fuel cell exists in an extreme environment. Prolonged exposure to oxygen at 200° C. is a very rigorous performance requirement. Even the stability of the carbon-fluorine bond is challenged under these conditions, particularly if inefficient reduction of oxygen should lead to generation of hydroxyl radicals. Any scheme to build membranes for high temperature fuel cell operation must consider the long-term stability of the membrane under such conditions. A further advantage of the comb architecture of the instant invention is that reactions with oxygen is likely to lead to bond breaking to yield smaller fragments that may be analyzed for by conventional analytical procedures.

Although the comb branch materials and dendrimers have inherent advantages over the linear polymers in terms of the transport properties, they have very poor mechanical properties, which result from the shapes of the polymers. To be practical the polymers must be cross-linked and this must be achieved after the polymer electrolytes have been cast in the form of a membrane separator or composite electrode. The cross-linking must also be achieved in a way that leaves no reactive groups or residues in the separator that could reduce the cycling efficiency. Further, it is desirable for the cross-linking process to be well controlled. Allcock et al., U.S. Pat. No. 5,747,604 has reported a controlled process for making polyphosphazene ethers (MEEP) and involves the use of hydrosilylation agents to form cross-links to allyl ether groups incorporated in the polymer in a well-controlled fashion. This reference is expressly incorporated herein by reference in its entirety.

This invention contemplates as useful for the polymer backbone both comb-branch polymers and dendrimers. Dendrimers are known in the art as useful for electrolytes, see U.S. Pat. No. 5,648,186 and U.S. Pat. No. 5,919,442, the contents of which are incorporated by reference in their entirety.

FIG. 1 shows how the cross-linking of the instant invention may be used to produce a cross-linked network with good mechanical properties but with the ether structures responsible for ion transport still unrestricted in their segmental motion. This network structure is inherently more useful than linear polymer networks of the prior art where the ether units are in the backbone and hence constrained by the excessive cross-linking.

The instant invention demonstrates that the comb-branch materials described and claimed herein may be cross-linked to provide materials with good mechanical properties (as a non-limiting example, Elastic modulus in shear mode=$5 \times 10^4$ Pa) and excellent ion transport properties that appear to be unaffected by the cross-linking density achieved to date. Cycling experiments in symmetrical lithium cells have demonstrated that the cross-linked materials inhibit dendrite growth and that the cross-linking process introduces no reactive residues. Full cells have been built with lithium and $V_6O_{13}$ and satisfactory cycling achieved.

Figure 2:
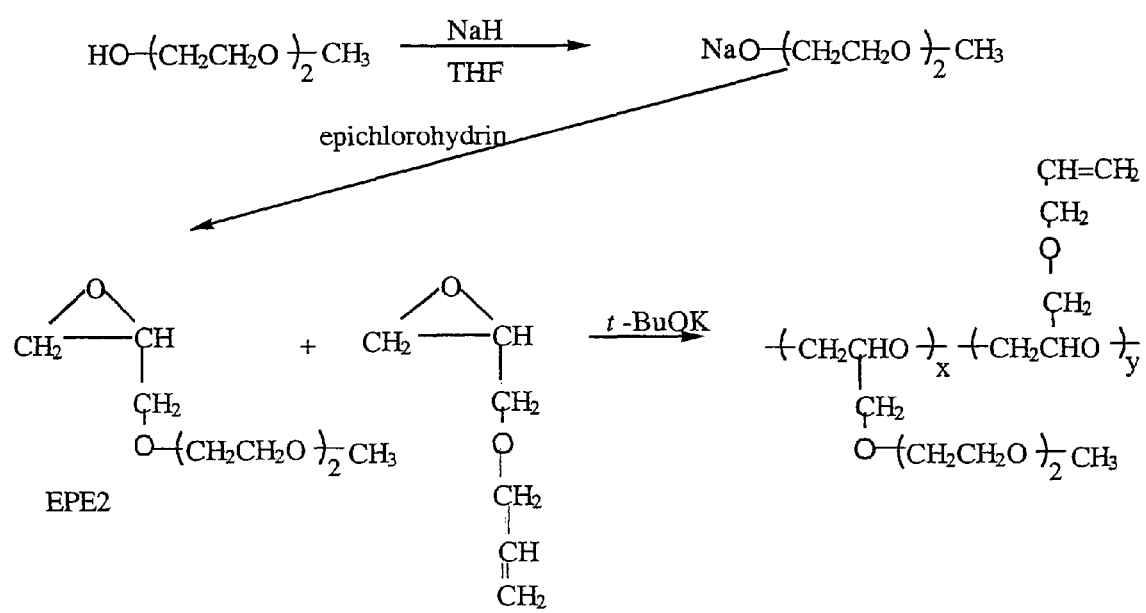
FIG. 2 A possible reaction scheme for the creation of a comb-branch polyepoxide ether.

An example of a base polymer is the polyepoxide ether copolymer with glycidyl allyl ether in various proportions to provide a cross-linkable comb-branch material on to which may be grafted anionic units by means of the hydrosilethane link similar to that shown in FIG. 2. A base polymer prepared from polyacrylate monomers is also easily prepared. Preparation of lithium allylethoxy-(ethoxy-(ethoxy))sulfonate is straight forward and the resulting material will be grafted on to the base polymers. The lithium salt of the polyacrylate ether sulfonate will be prepared by radical polymerization of the lithium sulfonate monomer.

Figure 3:
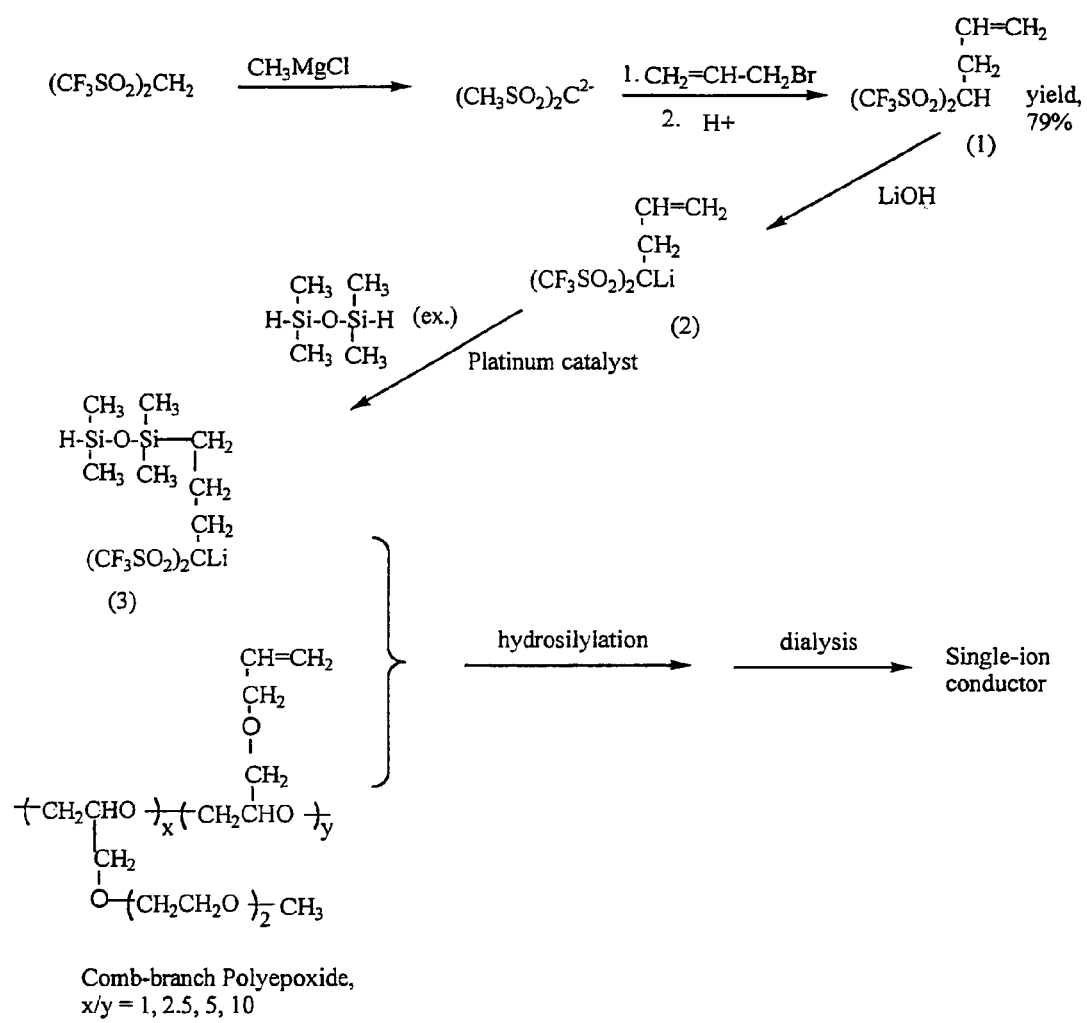
FIG. 3 Synthesis of single ion conductors using grafting chemistry
Figure 6:
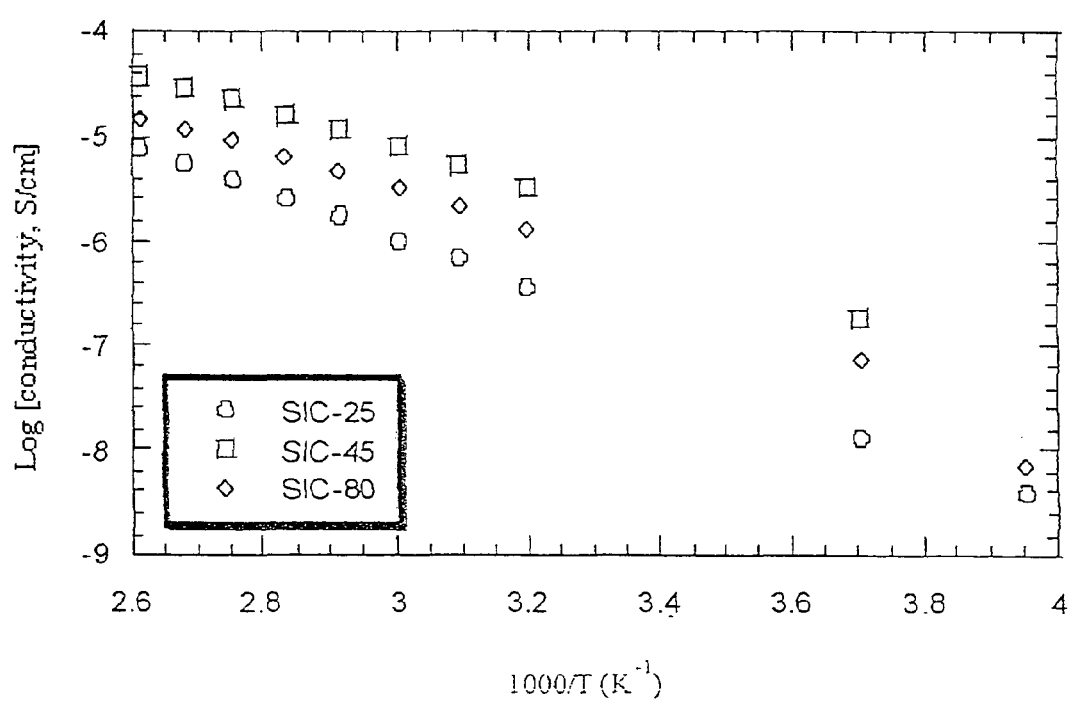
FIG. 6 Ionic conductivity of Comb-branch SIC as a function of temperature

The silylation chemistry used to achieve the cross-linking has been designed to provide a method to attach anionic groups to the side chain of a polymer via, for example, allyl groups. The following description with reference to FIG. 3, represents a non-limiting example and shows how an anion unit is prepared and how it is attached to the base polymer. The base polymer is prepared with a polypropylene oxide backbone and randomly distributed units containing the allyl group. The proportion of allyl groups can be varied from 1-30% (values of x and y in FIG. 3). The allyl groups can be used to attach the anions as well as to form the cross-links shown in FIG. 1. Typically the anions are attached first so that the soluble polymer may be analyzed by NMR to determine the efficiency of the graft reaction. Once the cross-linked materials are formed, the polyelectrolyte may be purified by washing with solvents to remove any reactive residues. Conductivities of materials prepared in this manner are shown in FIG. 6.

Figure 4A:
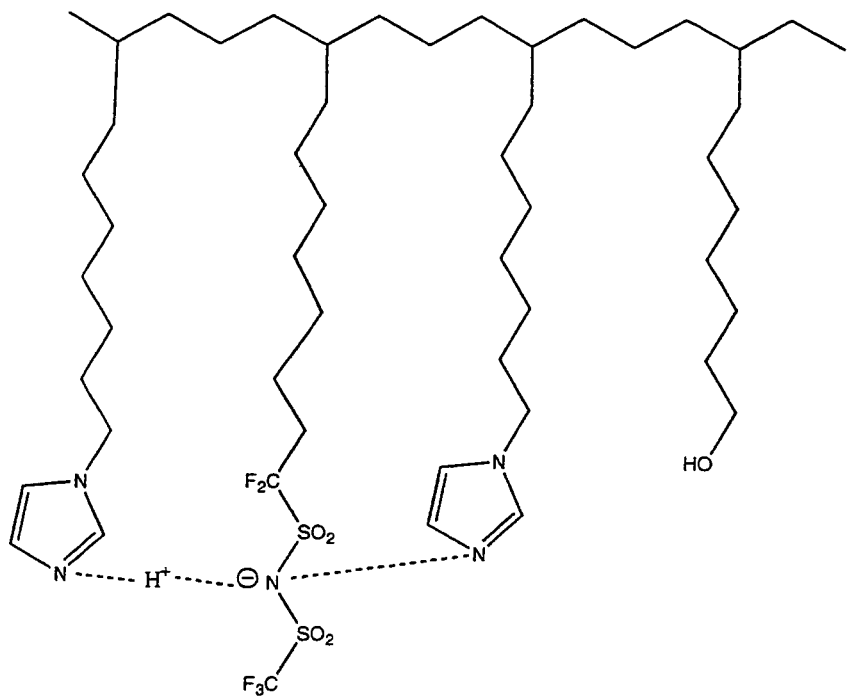
FIG. 4a Idealized imide/imidazole conductor.
Figure 4B:
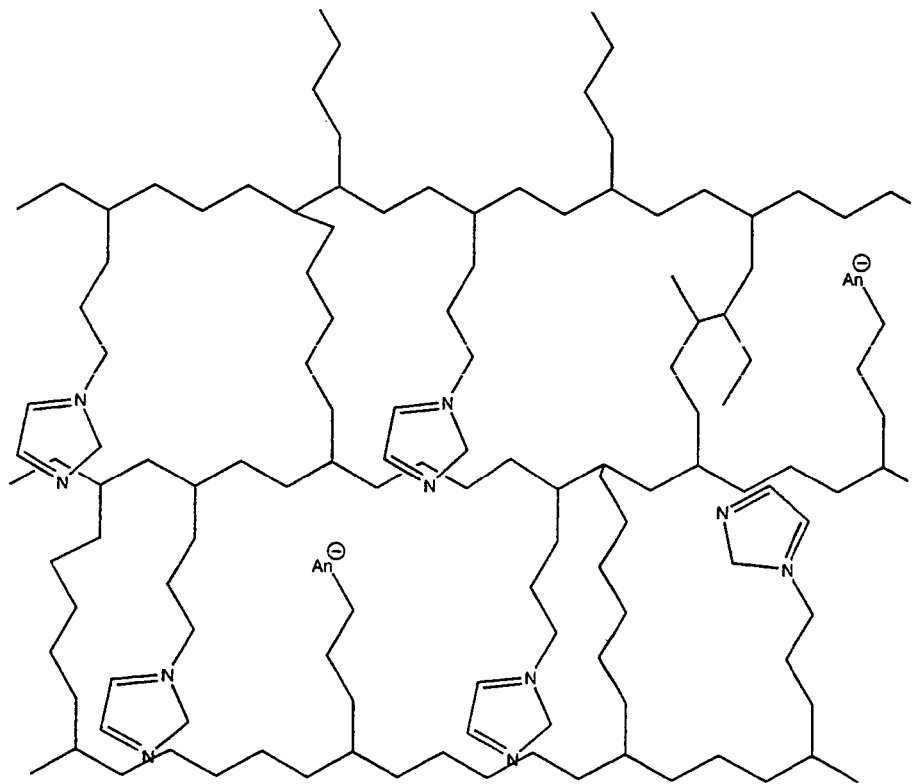
FIG. 4b Cross-linked membrane containing anions and imidazoles

FIG. 4a shows an idealized Imide/imidazole conductor. The alcohol function is a non-limiting example and is included purely to demonstrate the flexibility of the architecture. Electrochemical properties may be tuned by optimization of the ratio of imidazoles to anions. FIG. 4b a cross-linked membrane containing anions and imidazoles. Imidizoles are preferred for use with this invention. Side chains may be linear as shown or branched. Degradation reactions will break cross-links leading to poorer mechanical strength and small fragments from the anion and imidazole side chains which can be analyzed for by chemical analysis.

Imides and methides are particularly suitable for this invention. Imide and methide salts have been prepared and used previously for electrolytes, see U.S. Pat. No. 6,063,522, the contents of which are hereby incorporated by reference.

Figure 5:
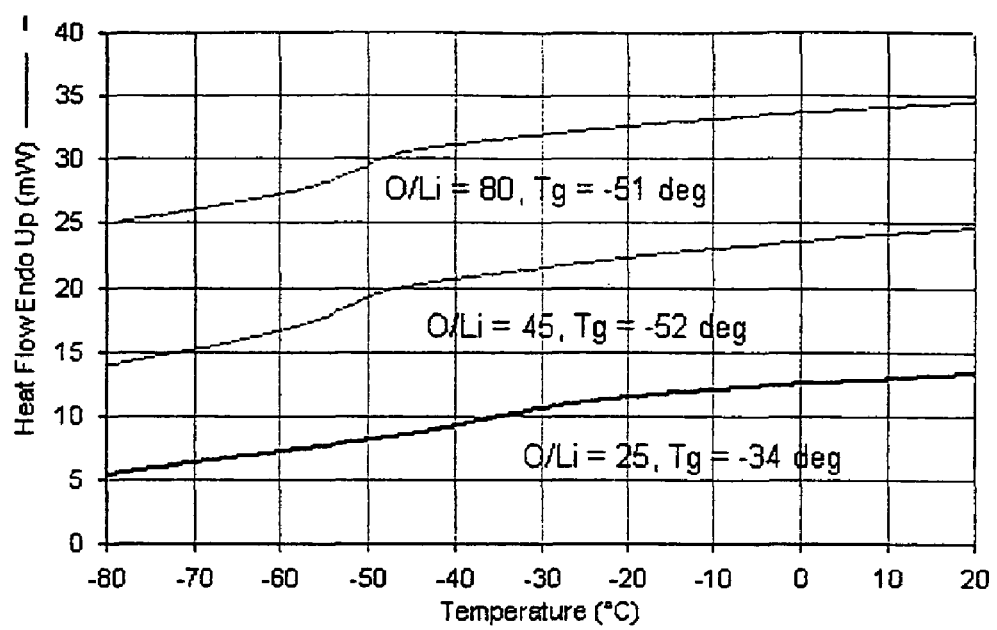
FIG. 5. DSC Scans for the Li$^+$ Single-ion conductors with different O/Li ratios.

There appears to be a preferred concentration for conductivity. FIG. 5 shows DSC analysis of the materials show them to be amorphous with $T_g$ values of about −52° C. for the SIC-80 and SIC-45 and −34° C. for SIC-25, which are consistent with the conductivity trends. The SIC materials were less elastic and stiffer than corresponding binary salt polymer electrolytes, indicating a considerable degree of ionic cross-linking. The materials have also been tested in symmetrical lithium cells and show no concentration polarization as expected. It may be noted, however, that hydroslioxanes were used to attach the anions and these may be less stable to lithium than the hydrosilylethanes used for cross-linking, which have been shown to be stable. The possibility that the fluorinated groups are not stable to lithium is not insignificant given their immobility.

Single-ion conductors have also been prepared according to the method of Zhang et al. *Journal of Applied Polymer Science* 1993, 48, 405-409; Zhang et al. *Solid State Ionics* 1995, 76, 121-125, the contents of which are hereby incorporated by reference in their entirety. This method fixes sulfonate anions to the end of side chains in a polyacrylate ether polymer. The inventors surprisingly found the results published therein not reproducible and developed the method described herein. The conductivity of the lithium sulfonate material with an O:Li ratio of 20:1 was similar to that of SIC-25 in FIG. 6. This finding strongly suggests that alkyl link to the methide group reduces the acidity and indicates that the link must be through a fluoroalkylsulfonyl group.

Fluorinated alkyl sulfonate units can be prepared according to the method of Cowie et al. *Solid State Ionics* 1999, 123, 233-242, the contents of which are hereby expressly incorporated by reference in its entirety, and grafted on to the base polymers by means of the allyl groups. The synthetic route is slightly different and simpler, and is shown in FIG. 9. The length of the side chain that the anion is attached to may be easily varied by change of the number, n, of EO units. "n" may be a number between 1 and 20, preferably between 1-12 and more preferably between 1 and 5. 1,3-propanediol units may also be incorporated in the chain to further increase flexibility. The observed sensitivity to concentration indicates that the introduction of fluoroalkylsulfonyl groups into the anion will lead to improved conductivities. While not wishing to be bound by any particular theory, it appears likely that the increased delocalization of the charge in trifluoromethylsulfonylimides and methides will lead to less ion pairing and allow higher concentrations of ions to be used. It has been reported an increase of nearly an order of magnitude in conductivity upon changing from an alkylsulfonate to a fluoroalkylsulfonate anion. Increases in conductivity of at least the same order are to be expected with the fluoroalkylsulfonyl imides and methides.

An alternative electrolyte is a methide composition. As a non-limiting example of methides, the fluoroalkylsulfonyl-methide polyelectrolyte can be synthesized by grafting allylether anion units prepared by routes similar to scheme 3 below. Similar schemes are possible to provide imide intermediates and alternative synthetic schemes are known in the art, see Desmarteau, D. D. *Journal of Fluorine Chemistry* 1995, 72, 203-208; Ying et al. *Journal of Fluorine Chemistry* 2000, 102, 135-139 and Zhu et al, *Journal of Fluorine Chemistry* 1995, 71, 81, the contents of which are incorporated by reference in their entirety. The intermediates can then be grafted onto the base polymers.

EXAMPLES

Diethylene glycol monomethyl ether (95%), sodiumhydride (95%), epichlorohydrin (99%), allyl glycidyl ether (99%), potassium t-butoxide in THF solution (1M), hydrogen hexachloroplatinate(IV) hydrate (99.9%), lithium hydroxide were purchased from Aldrich. 1,1,3,3-tetramethyldisiloxane was received from Gelest Inc. Bis-(trifluoromethylsulfonyl) methane was obtained from 3M and was purified by recrystallization in carbon tetrachloride followed by sublimation. THF was dried by refluxing over $CaH_2$ for two days before use, followed by distillation under argon. HPLC grade water was used for dialysis.

Example 1

The following is an example of the preparation of a comb-branch polyepoxide ether in accordance with FIG. 2. Preparation of monomer, EPE2. To a 250 ml flask was added sodium hydride (12.10 g, 0.48 mol) in the glove-box, 120 ml dried THF was then injected into the flask using a syringe. To this stirred mixture of NaH/THF, a solution of diethylene glycol monomethyl ether (50.61 g, 0.40 mol) in 40 ml dried THF was added slowly through a dropping funnel in ca. 45 min under Argon. The mixture was then heated to reflux for 3 hrs. It was then cooled down to room temperature (RT) and epichlorohydrin (74.02 g, 0.80 mol) was added in dropwise to the reaction system at room temperature. Ice water bath was used to control the reaction from over heating. The mixture was stirred overnight at 60° C. The reaction mixture was cooled back to RT and was filtered to remove salt. After THF was evaporated by a rotary evaporator, vacuum distillation was performed. The crude product was dried with calcium hydride at 60° C. before a second distillation. About 46.00 g of product was obtained at 53° C./55 mtorr (GC purity, 97%, Yield, 65.34%).

Example 2

A comb-branch polyepoxide ether is prepared in accordance with the reaction scheme of FIG. 3. To prepare 4,4-Bis (trifluoromethylsulfonyl) butene-1, 3.0 M solution of methylmagnesium chloride (40 ml, 0.12 mol) was added slowly to a stirred solution of methylene disulfone (14 g, 0.05 mol) in 60 ml THF. After gas bubbling stopped, allyl bromide (14.80 g, 0.12 mol) was added in 1 hr and the mixture was stirred under reflux for 2 hr. The reaction was cooled back to room temperature and was hydrolyzed with 30 ml 3.0 M HCl. The organic phase was separated and the major portion of solvent was removed by a rotavapor. The residue was stirred with water and extracted with diethyl ether. Distillation of the dry etherate ($MgSO_4$) afforded 12.60 g (79%) of 1: bp 50-54/o.8 torr, NMR ($CDCl_3$, ppm) 5.91(m, 1, CH2=CH—CH2-), 5.37 (m, 2, CH2=CH—CH2-), 3.21(t, 2, CH2=CH—CH2-), 4.87 (t, 1, CH(SO2CF3)2). The acid was then neutralized by 3N LiOH to yield lithium salt, 2. A quantitative amount of white solid was obtained after drying over $P_2O_5$ in drying piston at 110° C. NMR ($D_2O$): 5.85(m, 1, CH2=CH—CH2-), 5.10(q, 2, CH2=CH—CH2-), 3.10(d, 2, CH2=CH—CH2).

Hydrosilylation of compound 2, of FIG. 3. Lithium salt 2 (6.20 g, 0.02 mmol) was mixed with tetramethyldisiloxane (25.90 g, 0.20 mol) in 15 ml anhydrous THF. The catalyst solution was prepared by dissolving 1 g hydrogen hexachloroplatinate hydrate in 1 mL anhydrous ethanol and 9 mL glyme. After 0.7 mL of the catalyst solution was added, the mixture was heated to and kept at 60° C. under argon gas purging. After 2 days, the $^1$H NMR spectrum showed that the signals from CH=CH2 were disappeared, indicating that the addition reaction was completed. The excess of tetramethyl-disiloxane and the rest of solvent was evaporated under vacuum. The yield of 3 was quantitative. NMR: 4.65(m, 1, Si—H), 2.34(t, 2, CH2-CH2-CH2-Si), 1.56(m, 2, CH2-CH2-CH2-Si), 0.50(t, 2, CH2-CH2-CH2-Si), 0.14(d, 6, $(CH_3)_2$ SiH), 0.05(s, 6, CH2-Si$(CH_3)_2$).

Example 3

Preparation of comb-branch polyepoxides. A general procedure was followed for the preparation of copolymer with different ratios (1, 2.5, 5, 10) of EPE2/allyl glycidyl ether. A composition with a ratio of 5 was prepared as following: 50 mL flask with a side arm equipped with a high vacuum stopcock was treated by vacuum-nitrogen purging several times and flame baked using a propane flame before it was transferred to an oil bath which was preset at the desired temperature (67±3° C.). EPE2 (10 mL, 0.05 mol), allyl glycidyl ether (1.19 mL, 0.01 mol) and initiator, potassium tert-butoxide (0.90 mL, 0.90 mmol) were then loaded in order by using gas tight syringes. After stirring for 3 days, the reaction was quenched with methanol. The polymer was fractionated by dissolving in diethyl ether and then precipitated with hexane. After the removal of solvent, the polymer was then dissolved in 30 mL HPLC water and extracted with $CH_2Cl_2$/diethyl ether (v/v=3) twice in order to remove the residue base. The organic phase was condensed with a rotavapor and then dried at 65° C. under vacuum for 3 days. About 8.5 g of polymer was obtained (yield, 85.5%), it was a viscous liquid with molecular weight Mw around 20K (measured by GPC). NMR spectrum confirmed the random structure and desired composition. NMR($CDCl_3$, selected): 5.95(m, 1, CH2-CH=CH2), 5.30(q, 2, CH2-CH=CH2), 4.07(d, 2, CH2-CH=CH2), 3.37(s, 15, CH3).

Example 4

The preparation of a single-ion conductor is prepared as follows. The comb-branch copolymers were grafted with lithium salt 3 (of FIG. 3) by a hydrosilylation reaction under the platinum catalyst retained in the salt. The equivalent amount of salt and copolymer were dissolved in THF and refluxed for 3 days when about 75% of allyl groups were consumed. Diethyl ether was then added to precipitate the catalyst. After removal of diethyl ether, the slightly yellowish polymer was recovered and then dried. The polymer was finally subjected to dialysis using a membrane with a molecular weight cut-off of 6K-8K for 8 days. The solution was then concentrated under a rotary evaporator and was cast on Teflon coated substrates. The films were then transferred into a drying piston with $P_2O_5$ as a drying agent and dried under vacuum (50 mtorr) at 65° C. for 3 days. Transparent freestanding films were obtained.

Figure 7:
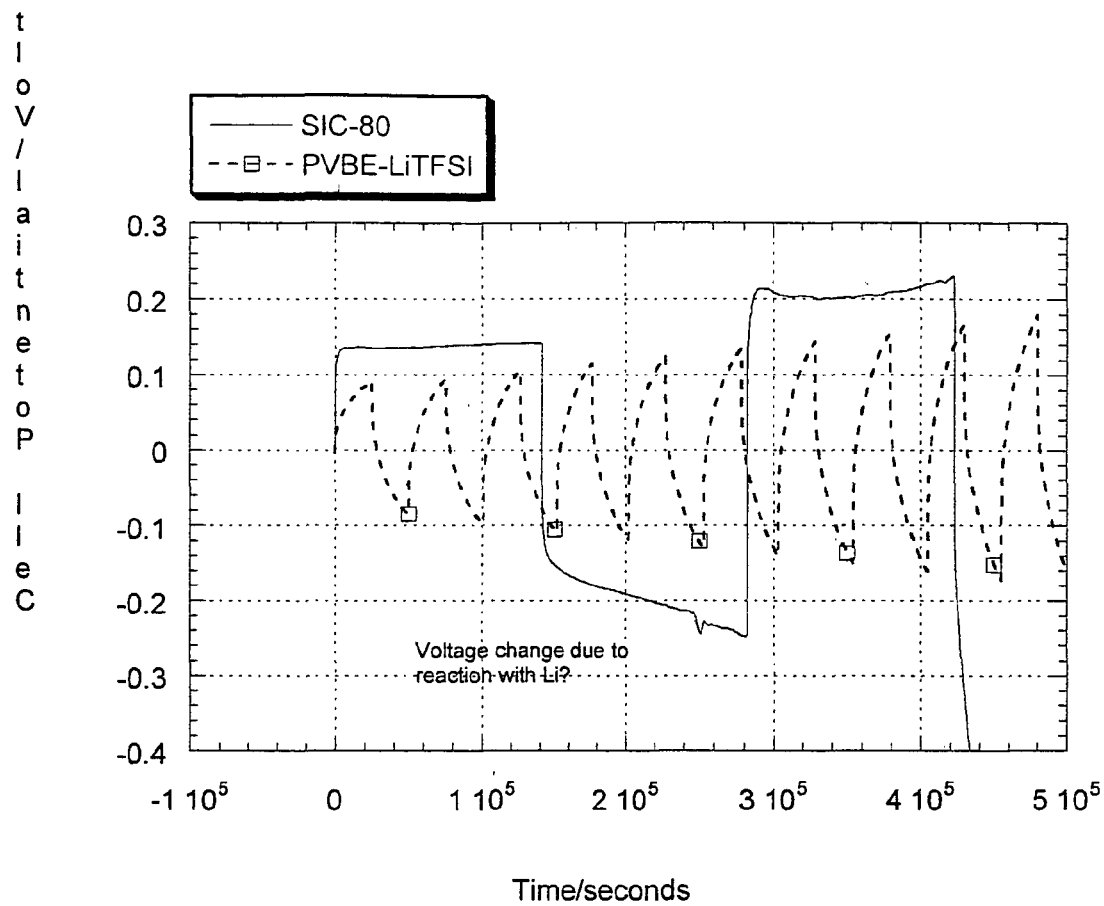
FIG. 7 Cycling behavior of Li/Li symmetrical cells at 85° C.
Figure 8:
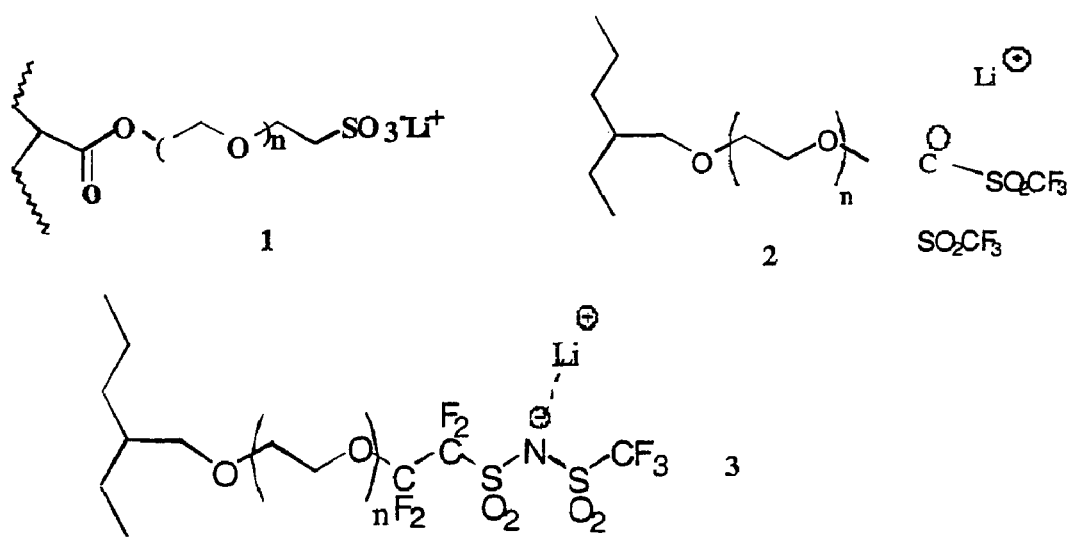
FIG. 8 Representative examples of anions fixed to the side-chains of comb-branch polymers. Example 1 is a sulfonate ion. Example 2 is a methide ion and Example 2 is a imide ion.
Figure 10:
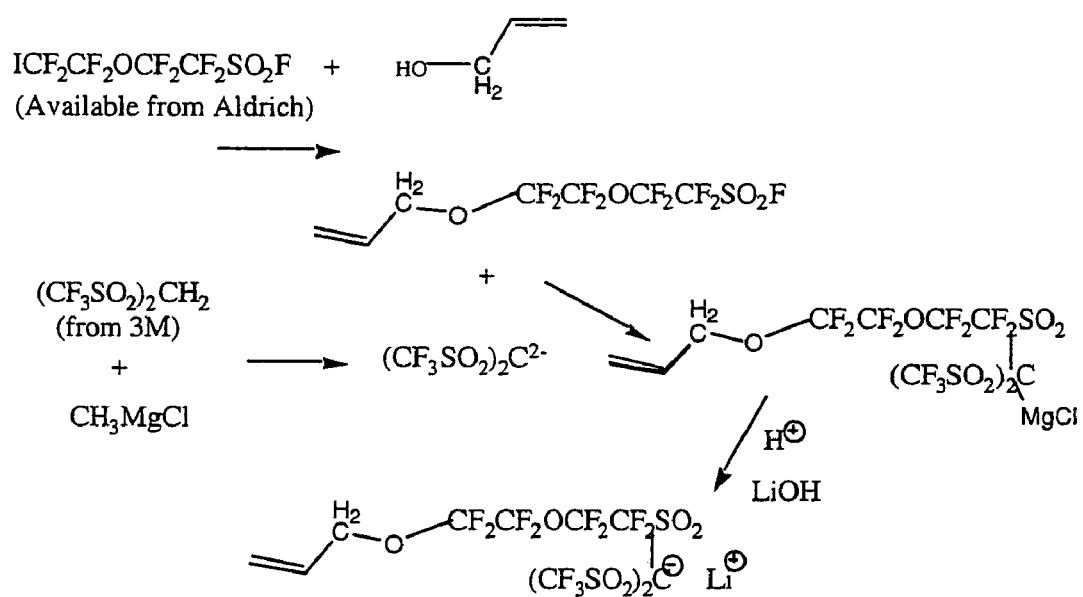

Measurements and characterization. All $^1H$ spectra were obtained from a Bruker AMX-400 NMR spectrometer. DSC and TGA scans were performed on Perkin-Elmer DSC-7 differential scanning calorimeter and TGA-7 thermogravimetric analyzer, respectively, at a heating rate of 10° C./min. Molecular weight and distribution of polymers were measured on a Rainin Dynamax HPLC modified GPC, using a minimix-B PL gel column. Ionic conductivity of the single-ion conductors was determined from complex impedance spectra measured with stainless steel blocking electrodes using a Solartron 1286 Frequency Response Analyzer. The cells were maintained at different temperatures for 0.5-1 hr until thermally stabilized, prior to measurement. The polymer films were examined by DSC and conductivity measurements (FIGS. 5 and 6, respectively). The results are consistent with expectations for a single-ion conductor material. Conductivities of the SIC-45 material are excellant as a value of $10^{-5}$ S/cm is obtained above 60° C. FIG. 7 shows the polarization behavior of the SIC-85 material at 85° C. where a current density of 0.05 $mA/cm^2$ is imposed on a symmetrical Li/polymer/Li cell. Both cells are cycled galvanostatically at 0.05 $mA/cm^2$. SIC-80 is the electrolyte shown in FIGS. 5 & 6 with a glass transition temperature of −51° C. and a conductivity of $10^{-5}$ S/cm at 85° C. The PVBE polymer is a cross-linked polyvinylbenzyle ether with a side chain length of 12 EO units. The behavior is contrasted with the behavior of a polymer electrolyte containing a lithium salt under similar current conditions. The invariant voltage behavior of SIC-85 is characteristic of a polyelectrolyte where the anion is covalently fixed to the polymer and only the $Li^+$. The cycle involved the passage of >7.2 $coulombs/cm^2$ of charge. The reverse cycle shows some drift in the voltage which may be due to reaction of the polyelectrolyte with lithium. After two cycles the cell fails due to reaction at the lithium metal. While not wishing to be bound by any particular theory, it is possible that this reaction may be due to the use of the disiloxane to graft the anion to the polymer. The stability will be improved by use of silanes instead which will not contain the labile Si—O—Si groups. Otherwise, the instability is most probably due to impurities which can be removed by more rigorous dialysis and drying procedures.

These results illustrate several points about the invention. The silane or siloxane reaction may be used to graft groups on to pre-polymers that are designed with a reactive allyl group. The graft reaction can be carried out in a manner that is quite clean and which can be improved by further purification of the polymer. The grafting reaction is very controllable and involves no other groups than the introduced allyl groups, though the instant invention is not so limited. Attachment of the anion to a longer chain leads to higher conductivities. Comparison with polyelectrolytes prepared with the same anion that was bound to a much shorter side chain shows that the conductivity is higher for the longer side-chain polymer. Variation of the concentration of the anion in the polyelectrolyte leads to an optimum conductivity. Direct comparison of the low lattice energy anion, $(CF_3SO_2)_2C^-$—Si~with a sulfonate anion bound in a similar fashion is inconclusive. The conductivities of the two polyelectrolytes are similar.

It will be appreciated that conductive compositions formulated with the novel electrolyte materials of the invention are also useful in the fabrication of fuel cells, sensors, supercapacitors, electrochromic devices, and the like, using manufacturing techniques well known to those skilled in the art, or readily available in the relevant literature.

Although the foregoing invention has been described in some detail for purposes of clarity of understanding, those skilled in the art will appreciate that various adaptations and modifications of the just described preferred embodiments can be configured without departing from the scope and spirit of the invention. Therefore, the described embodiments should be taken as illustrative and not restrictive, and the invention should not be limited to the details given herein but should be defined by the following claims and their full scope of equivalents. Further, it is to be understood that all references and patents cited herein are expressly incorporated herein by reference.

We claim:

1. A method of making a single-ion conductor comprising:
   grafting a salt compound on to a polymer containing double bonds,
   wherein the polymer comprises a comb-branch polymer,
   wherein the comb-branch polymer has the following structure:

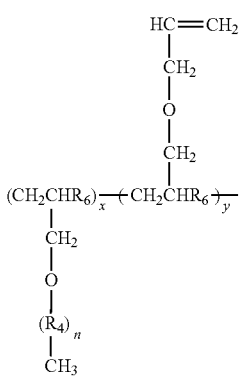

wherein $R_4$ comprises —$(CH_2CH_2O)$—, —$(CH_2CH_2CH_2O)$—, —$(CH_2CH_2CH_2CH_2O)$—, —$(CH_2CHR_5O)$—, where $R_5$ is $CH_3$—, $CH_3O$— or $CH_3OCH_2CH_2O$—, where $R_6$ is —$CH_2$, O, or NH, n is an integer from about 2 to about 20, and x and y are chosen such that the ratio x/y is from 1 to 30.

2. The method of claim 1, wherein the ratio x/y is less than or equal to 20.

3. The method of claim 2, wherein the ratio x/y is 1, 2.5, 5 or 10.

4. The method of claim 1, wherein n is between 2 and 7.

5. The method of claim 1, where $R_6$ is O or —$CH_2$.

6. The method of claim 5, where $R_6$ is —$CH_2$.

7. The method of claim 1, wherein the salt compound is chosen from the group consisting of perfluoroalkylsulfonyl methides and imides, perfluoroalkylsulfonates and alkylsulfonates, where the alkyl group is chosen from the group consisting of lower alkyls and higher alkyls.

* * * * *